(No Model.)
J. D. BEEBE.
BICYCLE TIRE.
No. 524,272. Patented Aug. 7, 1894.
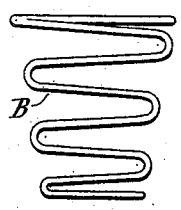
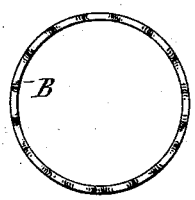
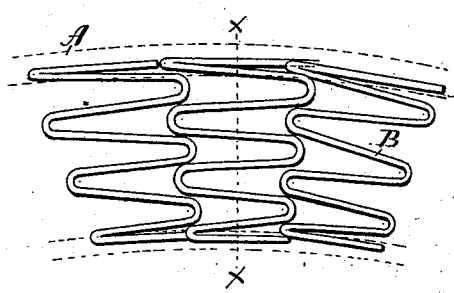
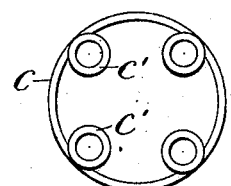
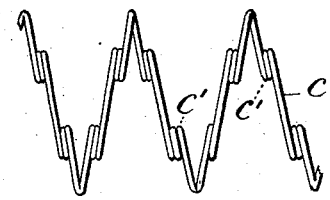
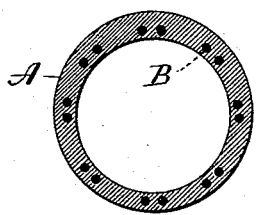
Witnesses
John D. Beebe
Inventor

UNITED STATES PATENT OFFICE.

JOHN DUNGAN BEEBE, OF COLUMBUS, OHIO, ASSIGNOR TO THE BEEBE TIRE MANUFACTURING COMPANY, OF PORTLAND, MAINE.

BICYCLE-TIRE.

SPECIFICATION forming part of Letters Patent No. 524,272, dated August 7, 1894.

Application filed January 15, 1894. Serial No. 496,953. (No model.)

*To all whom it may concern:*

Be it known that I, JOHN DUNGAN BEEBE, of Columbus, in the county of Franklin and State of Ohio, have invented a new Improvement in Bicycle-Tires; and I do hereby declare the following, when taken in connection with accompanying drawings and the letters of reference marked thereon, to be a full, clear, and exact description of the same, and which said drawings constitute part of this specification, and represent, in—

Figure 1, a broken view in side elevation illustrating one form which a tire constructed in accordance with my invention may assume, and showing three independently formed springs placed together as in a tube which is indicated by broken lines; Fig. 2, a view in transverse section on the line x—x of Fig. 1 with the rubber tube shown by full lines; Fig. 3, a detached view in side elevation of one of the springs; Fig. 4, an end view of the same; Fig. 5, an end view of a modified form of spring; Fig. 6, a distorted plan view thereof.

My invention relates to an improvement in bicycle tires, the object being to produce a light and resilient tire, having the same effective value as a pneumatic tire, but more durable than the same inasmuch as it is not disabled nor materially impaired by a puncture, which unfits a pneumatic tire for use.

With these ends in view, my invention consists in a bicycle tire, comprising a rubber tube and concentric wire springs embedded therein, each spring having secondary convolutions, and being thus adapted to be contracted independently of its neighbors.

My invention further consists in certain details of construction, as will be hereinafter described and pointed out in the claims.

In carrying out my invention, I preferably employ the construction shown in Figs. 1 to 4, inclusive, of the drawings. In that construction the tire is composed of a tube A of rubber and a series of independently formed circular springs B, each made of a single piece of wire and in its lateral extension tapering from its inner edge outward, in conformity with the difference in the size of the inner and outer periphery of the completed tire. Each of these springs is composed of a series of laterally arranged loops, gradually increasing in length from the inner edge of the spring outward, as clearly shown in Fig. 3, whereby the spring is made extremely elastic and responsive to compression in any direction. The said loops form, as it were, secondary convolutions, and in the spring described give it lateral extension. In assembling the springs, their loops are dodged, so to speak, and passed by each other for a short distance, as clearly shown in Fig. 1, whereby the action of one spring shades into that of its neighbor, and so on, thus virtually tying all the springs together and making their action continuous, as well as independent. It will be understood that in making the tire, these springs are entirely embedded in the rubber tube A, as shown in Fig. 2 of the drawings.

A tire constructed as described is light and extremely elastic, and if it suffers a puncture is practically uninjured. It may, if desired, be filled with compressed air, though it is very effective without it and will probably be so used. If any one spring should break its breakage would not be noticed in the action of the tire, because it would be held in place by the rubber in which it is embedded, and because the action of each individual spring is limited in its range and bound up with the action of the other springs.

Instead of forming the springs independently, as above described, I may form them in a long continuous coil from a single piece of wire, as shown in Figs. 5 and 6, and construct each spring or member C of the coil with four inwardly projecting secondary convolutions C' arranged quartering to each other, as shown in Fig. 5.

The springs or members C of the coil will, in practice, stand close together, but for convenience of illustration I have shown them separated in Fig. 6.

By providing the several members of the long coil with secondary convolutions, each member of the coil is adapted of itself to be compressed and contracted independently of its neighbors, and in this respect corresponds broadly in action to the independent springs of the construction first described.

It will be understood that the long coiled spring provided with inwardly projecting secondary convolutions is embedded in a rubber tube, which, however, has not been shown. In this case the secondary convolutions would project inwardly through the rubber. Each member or turn of the long coil constitutes in effect a spring corresponding to one of the independent springs of the construction first described.

In carrying out my invention, I might adopt still other forms of springs having secondary convolutions and designed with reference to being embedded in a rubber tube, in the general manner described, and I would therefore have it understood that I do not limit myself to the exact construction shown and described, but hold myself at liberty to make such changes and alterations as fairly fall within the spirit and scope of my invention.

Having fully described my invention, what I claim as new, and desire to secure by Letters Patent, is—

1. A bicycle tire composed of a rubber tube having concentric wire springs embedded in it, each of which has secondary convolutions to adapt it to yield independently of its neighbors, substantially as set forth.

2. A bicycle tire composed of a rubber tube, having concentric wire springs embedded in it, formed independently of each other, having lateral extension, each increasing in width from its inner to its outer edge, and each composed of a series of lateral loops which are dodged and passed by each other in the completed tire, substantially as set forth.

In testimony whereof I have signed this specification in the presence of two subscribing witnesses.

JOHN DUNGAN BEEBE.

Witnesses:
JNO. C. BALDERSTON,
H. STORER BARRY.